United States Patent
Cote

(10) Patent No.: US 10,918,092 B2
(45) Date of Patent: Feb. 16, 2021

(54) ROTATABLE LOCKING COVER FOR A HANGING BIRD FEEDER

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 251 days.

(21) Appl. No.: 15/932,468

(22) Filed: Mar. 2, 2018

(65) Prior Publication Data

US 2019/0269104 A1 Sep. 5, 2019

(51) Int. Cl.
*A01K 39/012* (2006.01)

(52) U.S. Cl.
CPC .................. *A01K 39/012* (2013.01)

(58) Field of Classification Search
CPC ...... A01K 39/00; A01K 39/01; A01K 39/012; A01K 39/0113
See application file for complete search history.

(56) References Cited

U.S. PATENT DOCUMENTS

| | | | | |
|---|---|---|---|---|
| 3,568,641 A * | 3/1971 | Kilham | ................ | A01K 39/012 119/57.8 |
| 4,246,869 A * | 1/1981 | Tobin, Jr. | ............. | A01K 39/012 119/57.8 |
| 4,355,597 A * | 10/1982 | Blasbalg | .............. | A01K 39/012 119/57.8 |
| 4,690,101 A * | 9/1987 | Kilham | ................ | A01K 39/012 119/52.2 |
| 4,829,934 A * | 5/1989 | Blasbalg | .............. | A01K 39/012 119/57.8 |
| 4,940,019 A * | 7/1990 | Coffer | .................... | A01K 39/00 119/52.2 |
| 4,977,859 A * | 12/1990 | Kilham | ................ | A01K 39/012 119/52.2 |
| 5,062,388 A * | 11/1991 | Kilham | ................ | A01K 39/012 119/52.2 |
| 5,095,847 A * | 3/1992 | Coffer | .................... | A01K 39/00 119/52.2 |
| 5,105,765 A * | 4/1992 | Loken | ................ | A01K 39/0113 119/57.9 |
| 5,123,380 A * | 6/1992 | Edwards | .............. | A01K 39/012 119/52.2 |

(Continued)

FOREIGN PATENT DOCUMENTS

CA 2687868 A1 * 6/2010 ........... A01K 39/012

*Primary Examiner* — Monica L Barlow
*Assistant Examiner* — Aaron M Rodziwicz
(74) *Attorney, Agent, or Firm* — Andrews Robichaud PC; Alessandro Colonnier

(57) ABSTRACT

A bird feeder which comprises a seed tube having an upper end and a lower end, the lower end having feed openings therein, a top ring sitting on the upper end of the seed tube, the top ring having a top ring upper portion and a top ring lower portion with the top ring lower portion extending downwardly to engage with the upper end of the seed tube, the top ring upper portion having first and second slots formed therein, a cover removably secured to the top ring, the cover having first and second apertures formed therein, and a hanger having first and second end sections with each of the first and second end sections having an enlarged arrangement located thereat, each of the first and second end sections passing through a respective one of the first and second slots with the enlarged arrangement preventing passage of the ends through the slots.

10 Claims, 21 Drawing Sheets

(56) References Cited

U.S. PATENT DOCUMENTS

| | | | | |
|---|---|---|---|---|
| 5,195,460 | A | * | 3/1993 | Loken ................ A01K 39/0113 119/57.9 |
| 5,207,181 | A | * | 5/1993 | Loken ................ A01K 39/0113 119/57.9 |
| 5,215,039 | A | * | 6/1993 | Bescherer ............ A01K 39/012 119/468 |
| 5,235,935 | A | * | 8/1993 | Edwards .............. A01K 39/012 119/52.3 |
| 5,642,689 | A | * | 7/1997 | Harvey ................ A01K 39/012 119/57.8 |
| 2002/0069829 | A1 | * | 6/2002 | McMahon ............ A01K 39/00 119/51.01 |
| 2003/0033985 | A1 | * | 2/2003 | Hardison .............. A01K 39/00 119/57.9 |
| 2005/0257749 | A1 | * | 11/2005 | Kuelbs .................. A01K 39/00 119/57.8 |
| 2006/0016400 | A1 | * | 1/2006 | Rich .................... A01K 39/012 119/57.8 |
| 2006/0065199 | A1 | * | 3/2006 | Davis .................. A01K 5/0225 119/51.01 |
| 2006/0118055 | A1 | * | 6/2006 | Kuelbs .................. A01K 39/00 119/57.8 |
| 2010/0031890 | A1 | * | 2/2010 | Vosbikian ............ A01K 39/012 119/52.4 |
| 2011/0100299 | A1 | * | 5/2011 | Colwell ................ A01K 31/12 119/52.2 |
| 2014/0261200 | A1 | * | 9/2014 | Tu ........................ A01K 39/012 119/57.8 |
| 2015/0334995 | A1 | * | 11/2015 | Cote .................... A01K 39/012 119/52.4 |
| 2019/0000045 | A1 | * | 1/2019 | Donegan ................ A01K 39/01 |

* cited by examiner

ROTATABLE LOCKING COVER FOR A HANGING BIRD FEEDER

FIELD OF THE INVENTION

The present invention relates to a bird feeder and more particularly, relates to the locking of a cover on a seed tube of a bird feeder.

BACKGROUND OF THE INVENTION

Bird feeders are well known in the art and there are many different types which have been proposed. Basically, however, there are only two types of bird feeders based on the manner in which the feeders are supported. A first type is when the bird feeder sits on a surface and is supported from the base. A variation of this type of support is the use of a pole which fits within an aperture formed in the base to thereby support a bird feeder.

A second type of support is probably more common and is classified as a hanging bird feeder. In this type of bird feeder, a hanger is connected to a portion of the bird feeder to thereby support the same. Typically the hanger will be connected to a cap which sits on top of a seed tube.

The seed tube itself will have either openings in the side thereof or will have means to dispense seeds to a seed tray disposed below the seed tube.

Although one can use a number of different mechanisms for securing the cover to the seed tube, generally a rotatable locking mechanism is utilized. In such an arrangement, mating parts on the cover and seed tube are designed to be engaged and disengaged with a rotary movement of the cover on the top of the seed tube.

When such an arrangement is utilized, the cover is disengaged from the seed tube and put aside during the filling of the seed tube. While this permits easy access to the seed tube, the removal of the cover can present a problem as far as dropping or misplacing of the same. However, no other practical arrangement has existed.

SUMMARY OF THE INVENTION

It is an object of the present invention to provide a novel arrangement for the cover and the method of attaching the cover to the seed tube.

According to one aspect of the present invention, there is provided a bird feeder comprising a seed tube having an upper end and a lower end, the lower end having feed openings therein, a top ring sitting on the upper end, the top ring having a top ring upper portion and a top ring lower portion, the top ring lower portion extending downwardly to engage with the upper end of the seed tube, the top ring upper portion having first and second slots formed therein, a cover removably secured to the top ring, the cover having first and second apertures formed therein, and a hanger having first and second end sections, each of the first and second end sections having an enlarged arrangement located thereat, each of the first and second end sections passing through a respective one of the first and second slots.

The bird feeder of the present invention provides an arrangement whereby the hanger may be connected to the seed tube (directly or indirectly) such that the cover is always retained in proximity to the bird feeder even when the cover is removed.

The bird feeder of the present invention will utilize a seed tube which will be associated with means for distributing the seeds to the birds. The bird feeder of the present invention can utilize many different arrangements including ones wherein feed ports are provided in the lower portion of the seed tube such that birds may access the seeds. Typically, perches are provided in the area of the feed openings. Preferably, the bird feeder is of a squirrel proof nature.

An alternative arrangement instead of feed ports could provide for the seeds to feed to a seed tray which again can be accessed by the birds. The bottom part of the bird feeder may include various types of bases which can also serve as a perch for the birds when they are feeding.

The seed tube itself is normally cylindrical in configuration. This arrangement allows for the rotatable locking of the cover with the seed tube. However, it will understood that other configurations could be utilized such as having only a circular arrangement at the top of the seed tube.

The material utilized in the practice of the present invention can be any suitable known to those knowledgeable in the art. However, a majority of bird feeders utilize a suitable plastic material having the desired properties for the final product. Thus, it is conventional that the seed tube be formed of a transparent plastic material whereby visual access may be had to the interior to ascertain the level of seeds at any point in time. Typically, other components of the seed tube can be formed of different plastic materials; again many of these materials are known to those knowledgeable in the art.

The present invention preferably utilizes a top ring which fits on top of the seed tube. The top ring is preferably formed of a relatively rigid plastic material compared to the flexible material forming the seed tube. The top ring forms an interface between the seed tube and the cover. A ring locks with the cover by means of a plurality of protrusions as will be described in greater detail hereinbelow.

The bird feeder of the present invention may utilize different arrangements for the actual feeding of the birds. Thus, the bird feeder may be of the squirrel proof type wherein a shroud having feed openings therein can either be aligned or misaligned with the feed openings in the seed tube. Alternatively, a more conventional arrangement wherein free access to the feed tube may be utilized.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
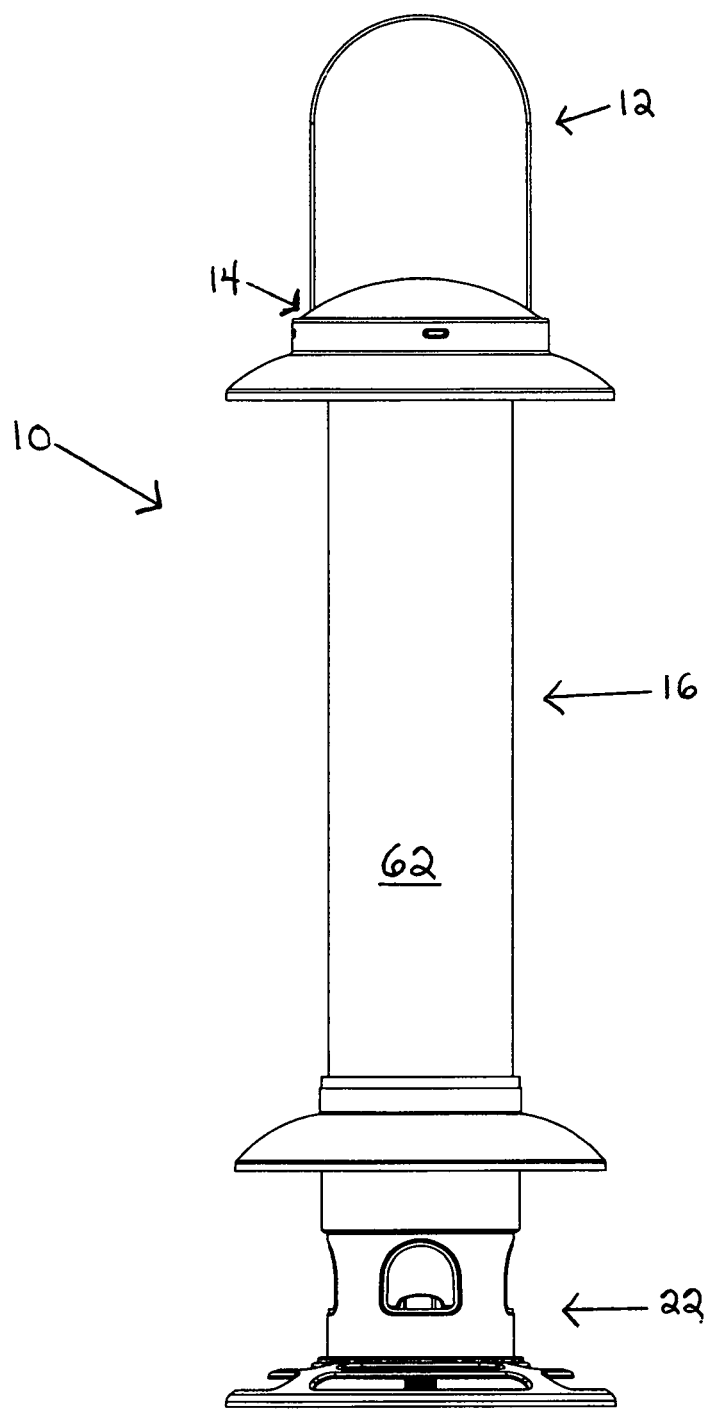
FIG. 1 is a front elevational view of a bird feeder according to one embodiment of the present invention.
Figure 2:
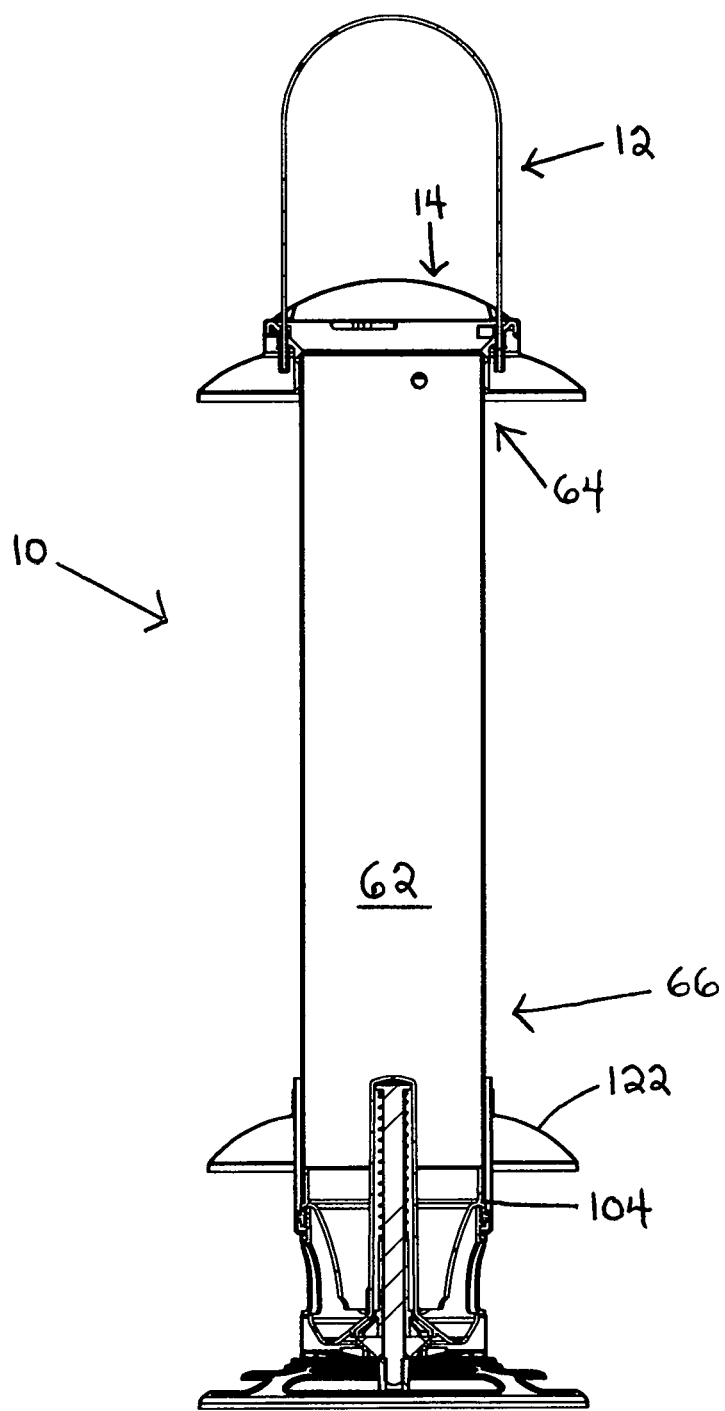
FIG. 2 is a longitudinal cross-sectional view thereof.
Figure 3:
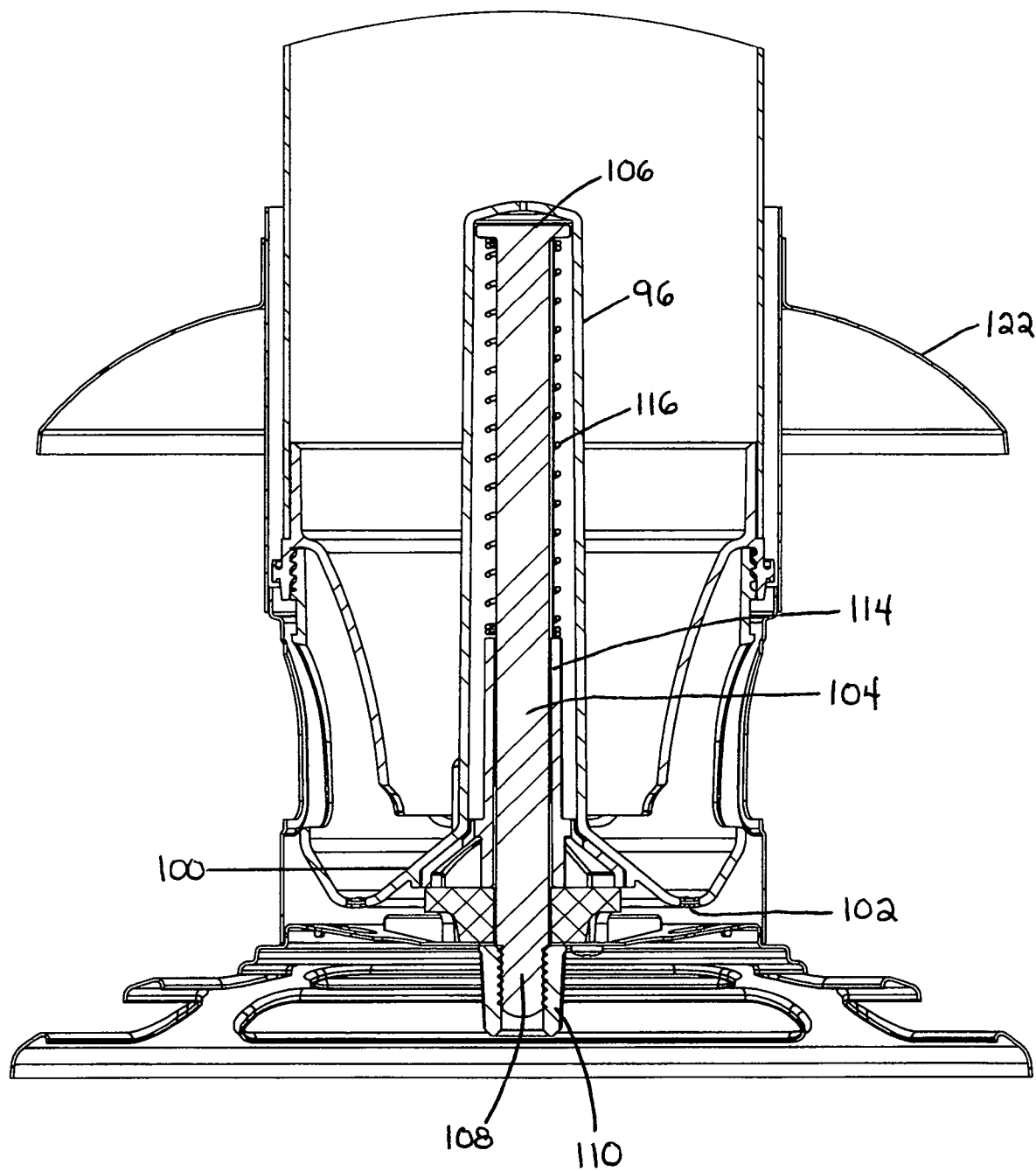
FIG. 3 is an expanded cross-sectional view of the lower portion of the bird feeder of FIG. 1.
Figure 4:
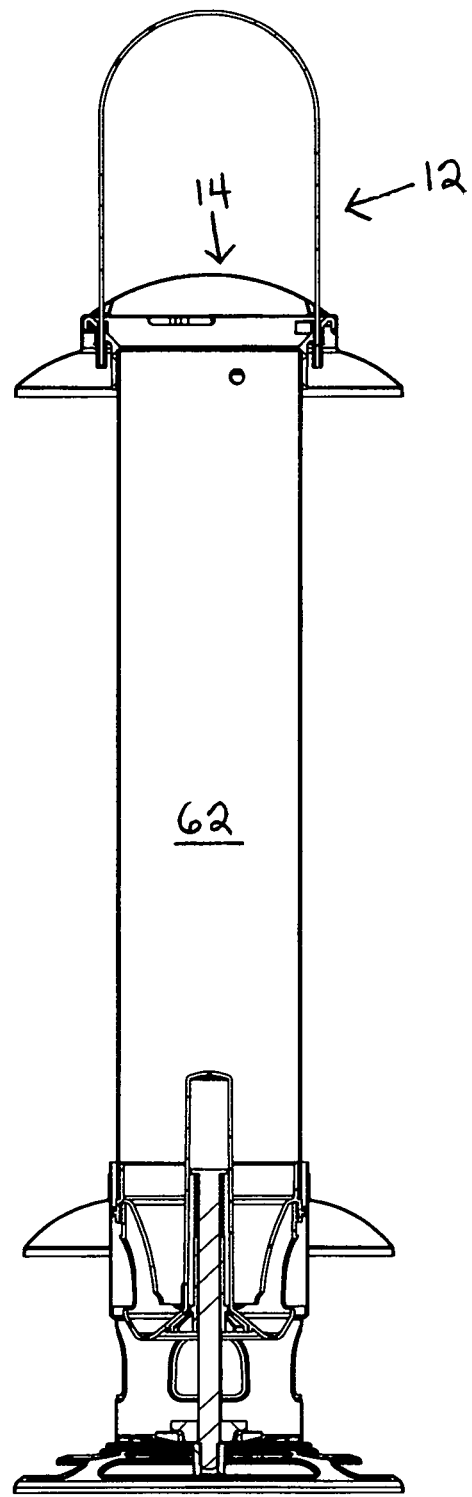
FIG. 4 is longitudinal cross-sectional view of the bird feeder when the shroud is in a lowered position.
Figure 5:
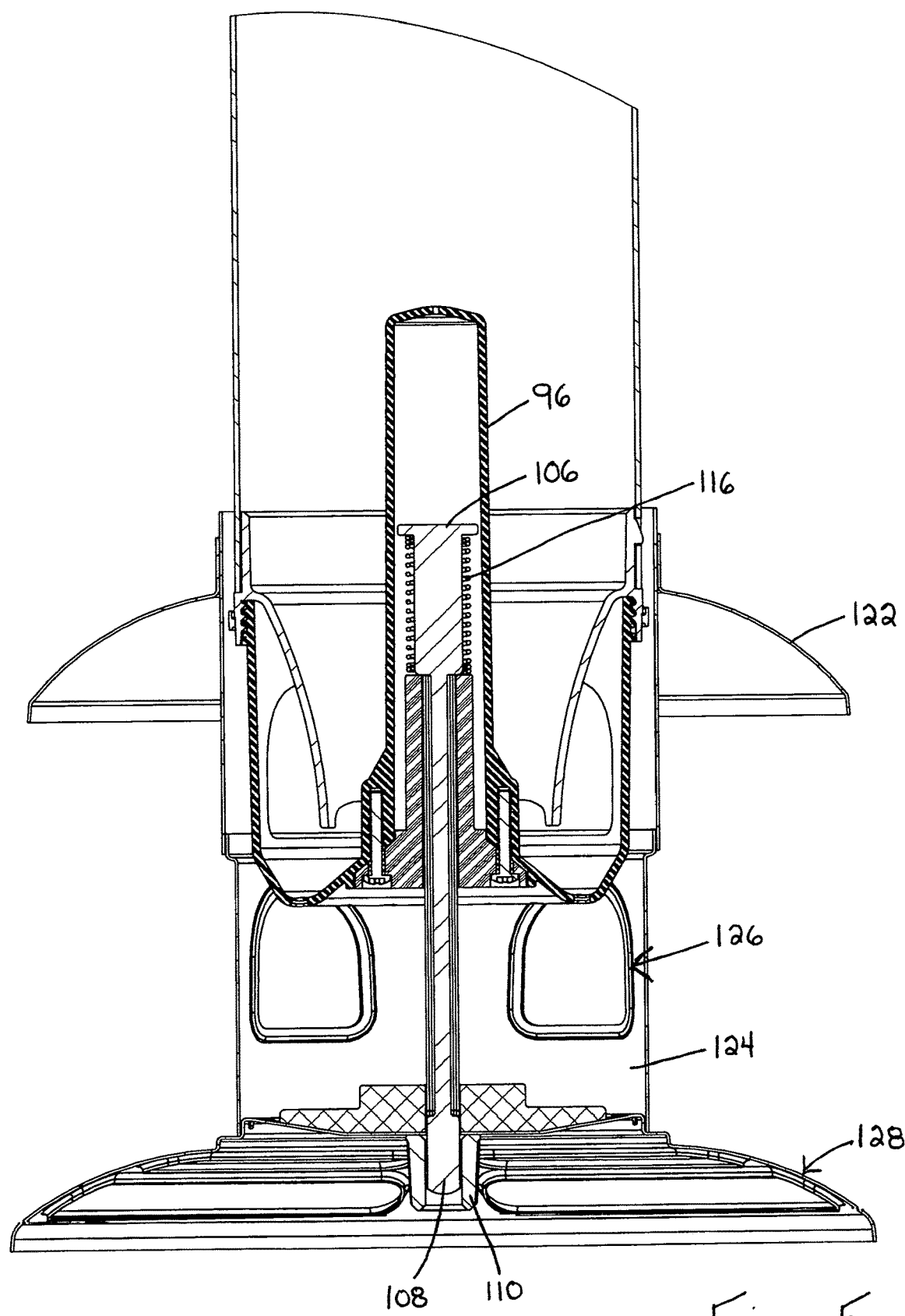
FIG. 5 is an expanded view of the lower portion of the arrangement of FIG. 4.
Figure 6:
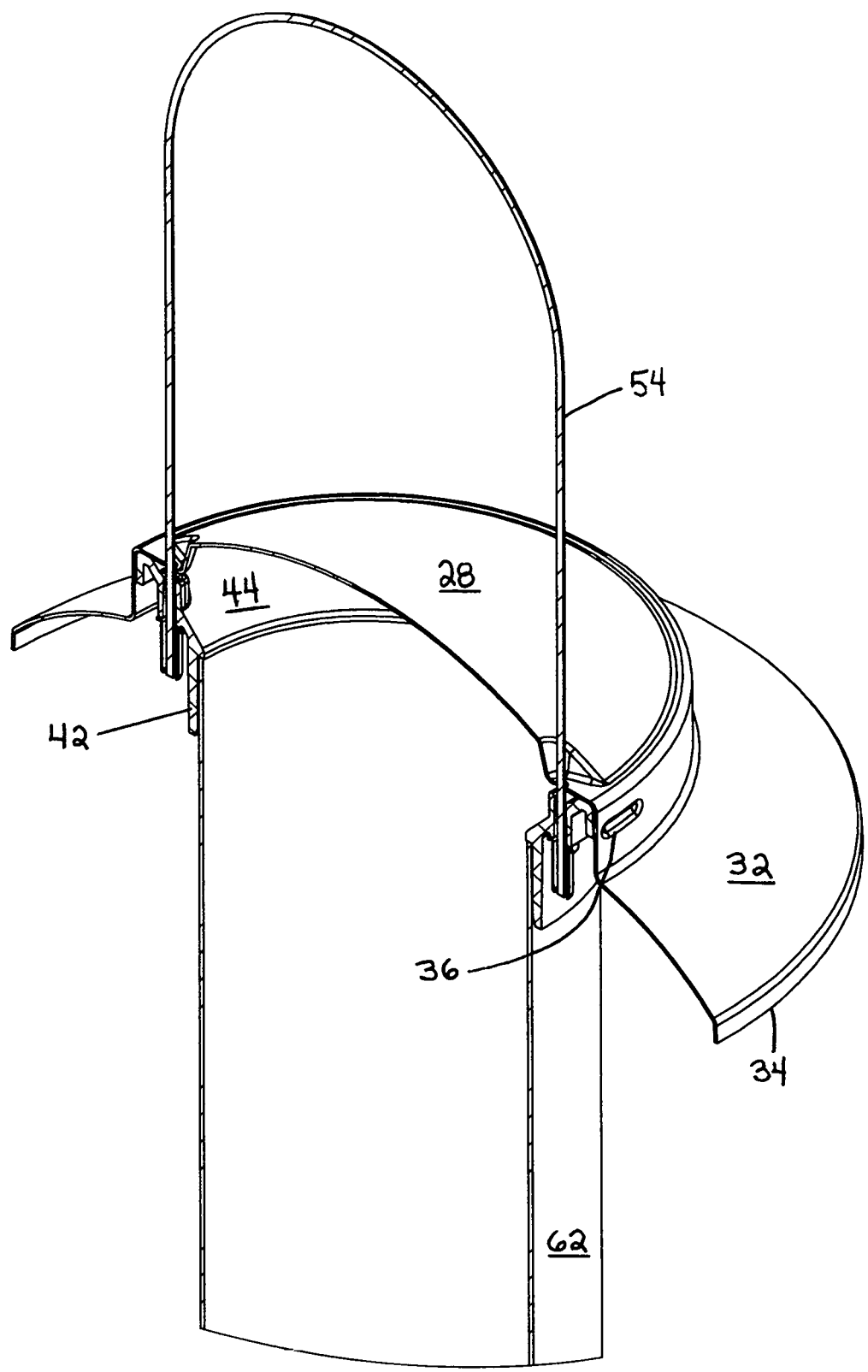
FIG. 6 is a perspective cross-sectional view of the upper portion of the bird feeder.
Figure 7:
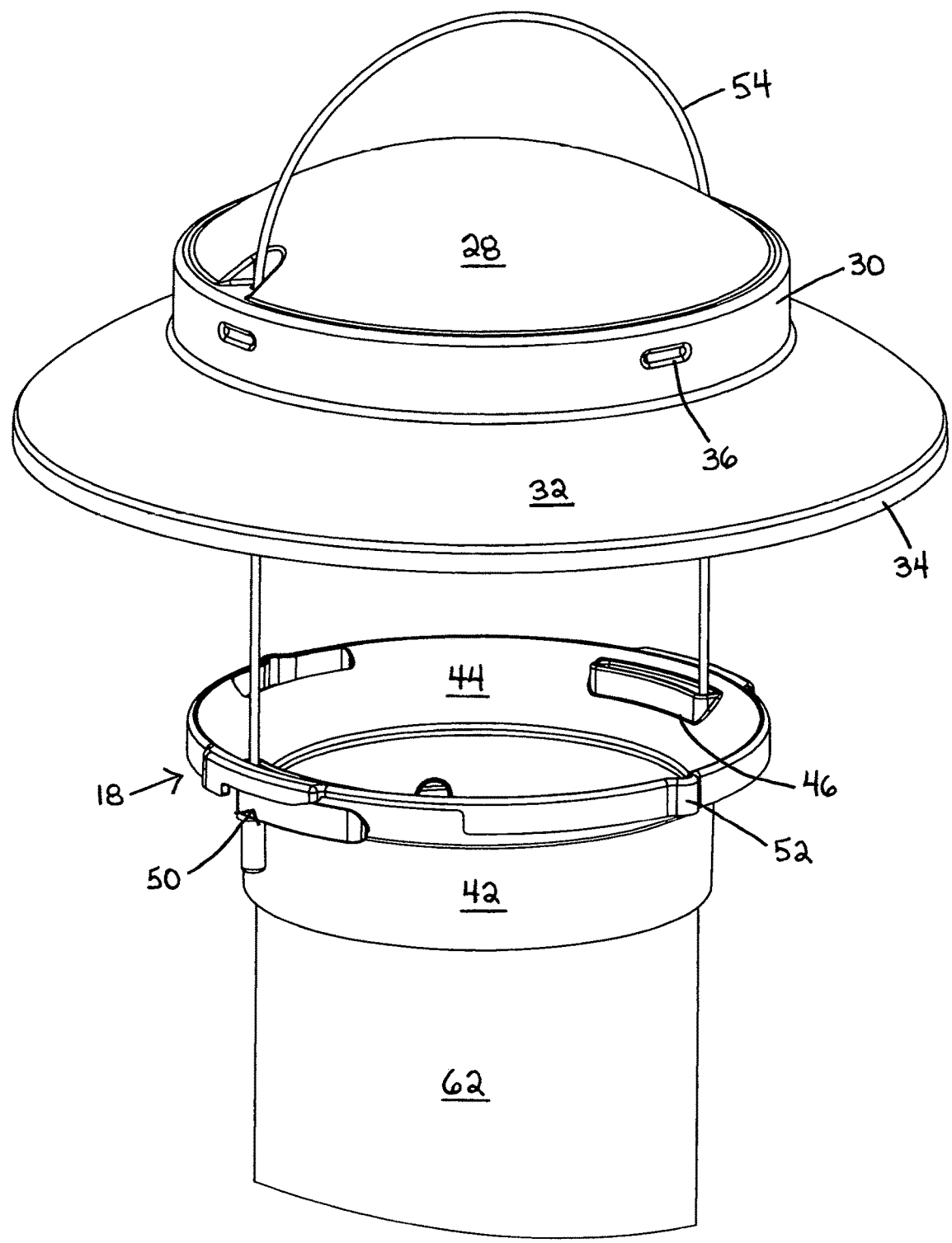
FIG. 7 is an expanded perspective view of the bird feeder when the cover is in a raised position.
Figure 8:
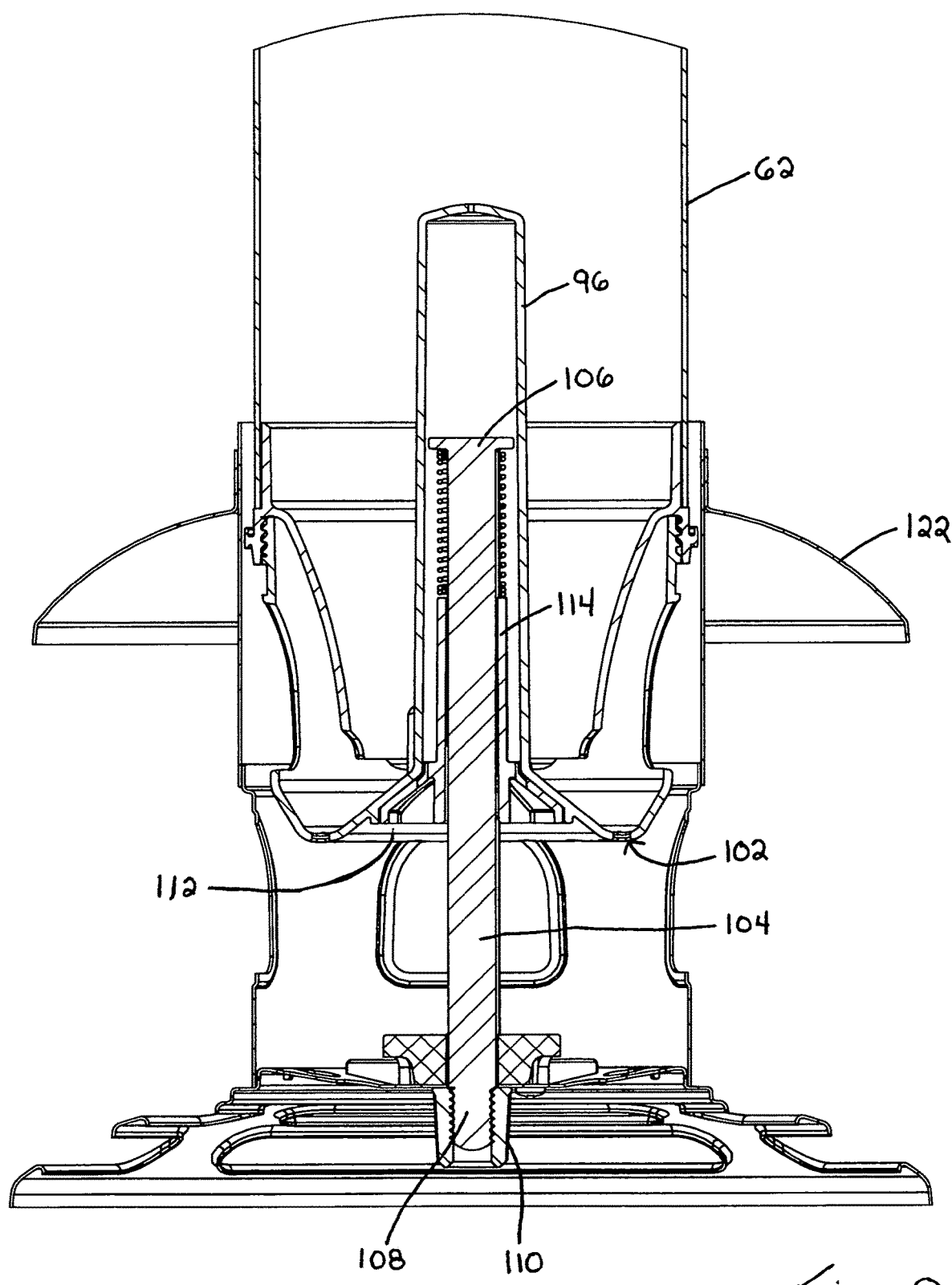
FIG. 8 is an expanded cross-sectional view of the lower portion of the bird feeder when the shroud is in a lower position.
Figure 9:
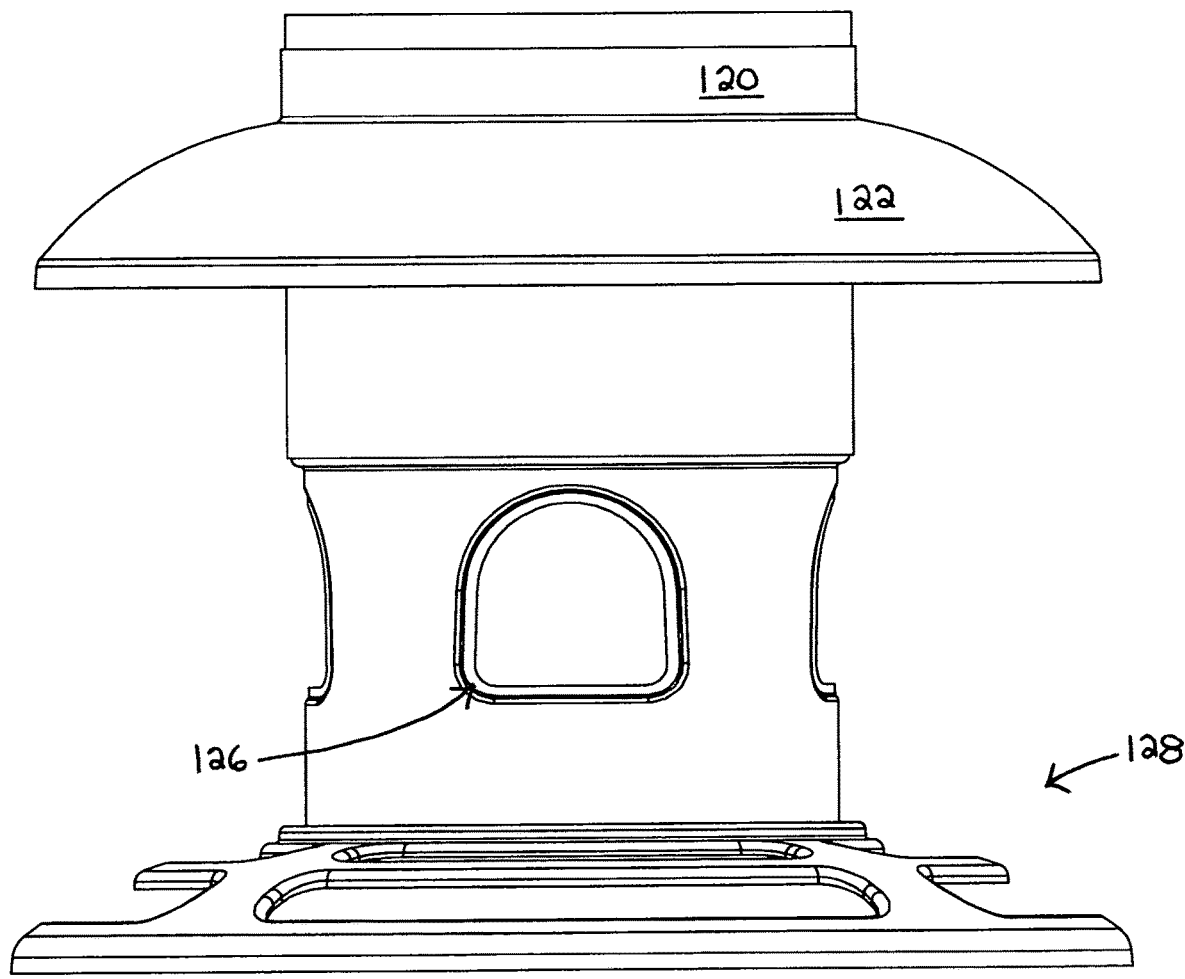
FIG. 9 is a side elevational view thereof.
Figure 10:
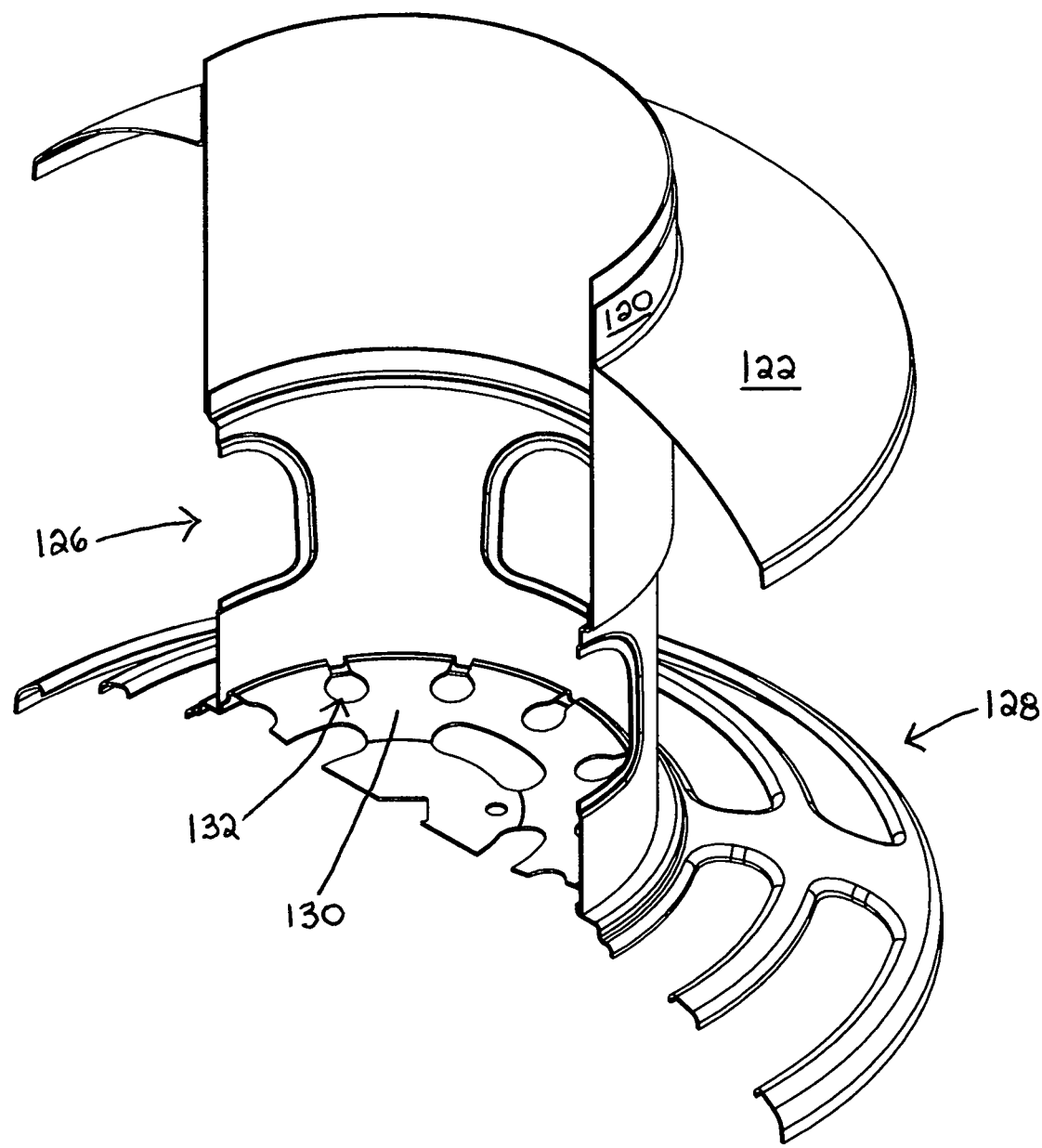
FIG. 10 is a perspective sectional view of the shroud.
Figure 11:
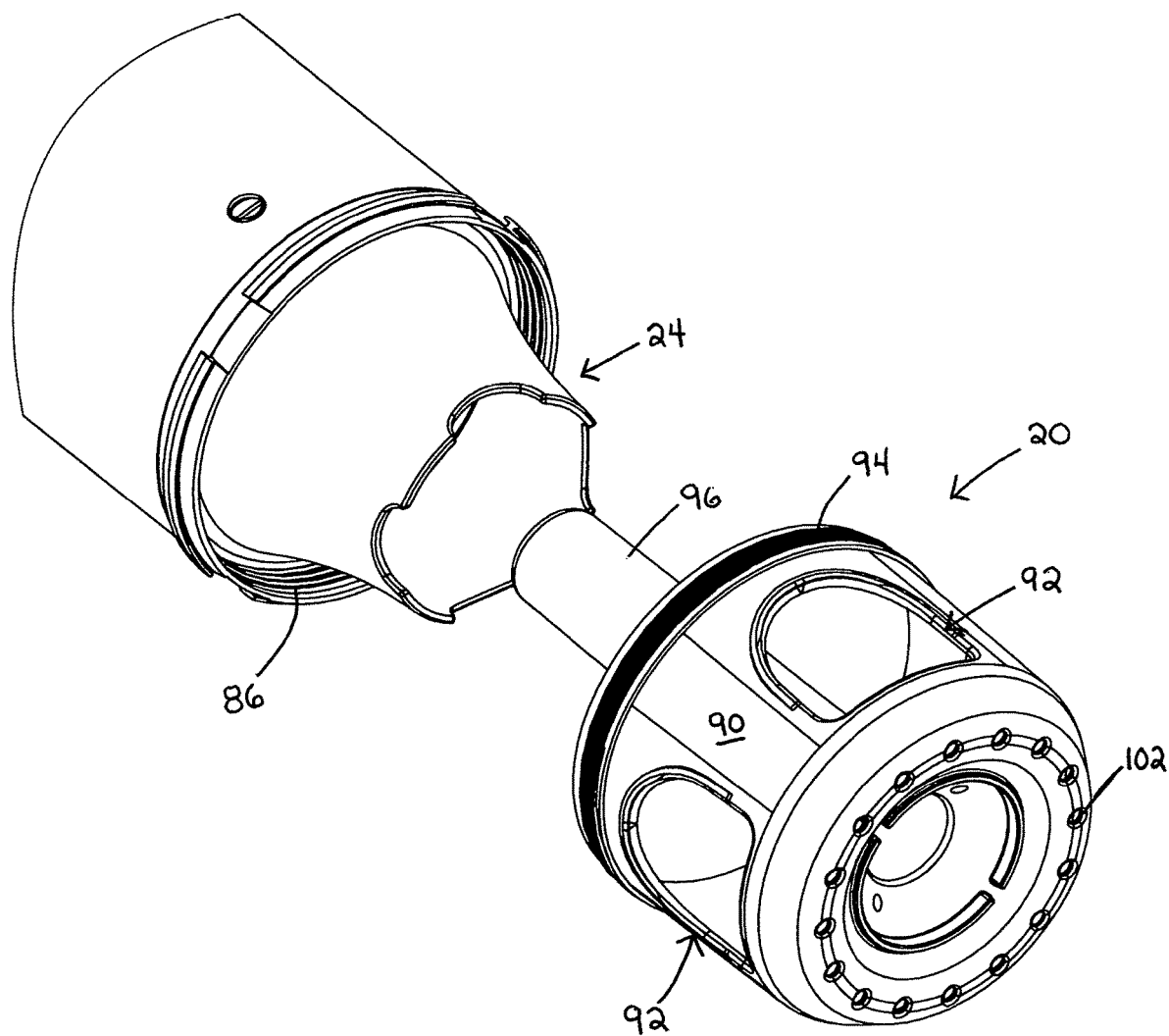
FIG. 11 is an exploded view of the feed container and a lower portion of the seed tube.
Figure 12:
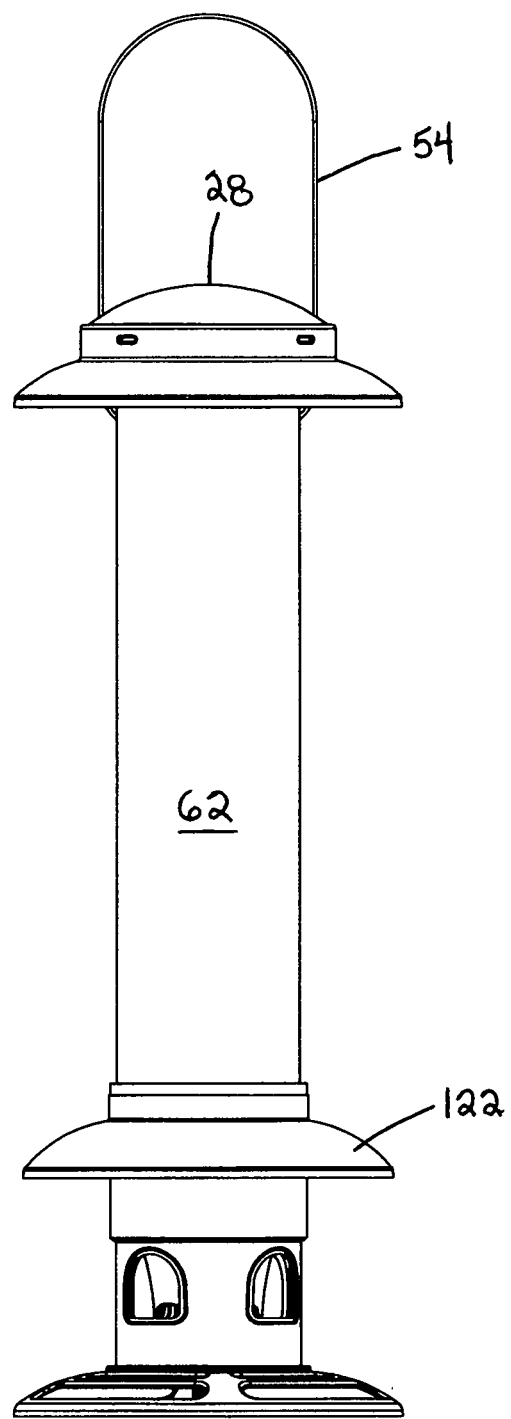
FIG. 12 is an elevational view of a further embodiment of a bird feeder.
Figure 13:
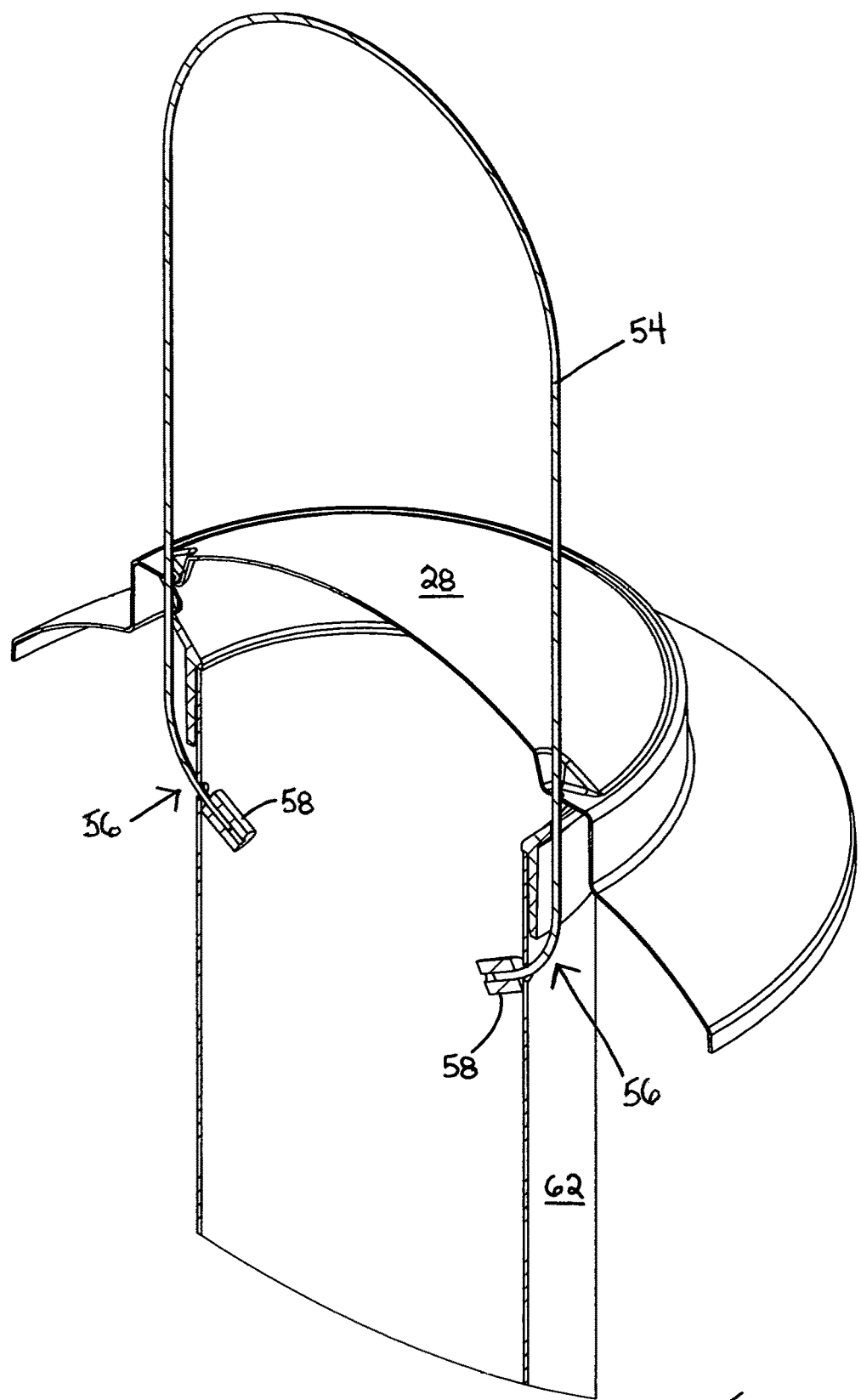
FIG. 13 is an expanded cross-sectional view of the upper portion of the bird feeder of FIG. 12.
Figure 14:
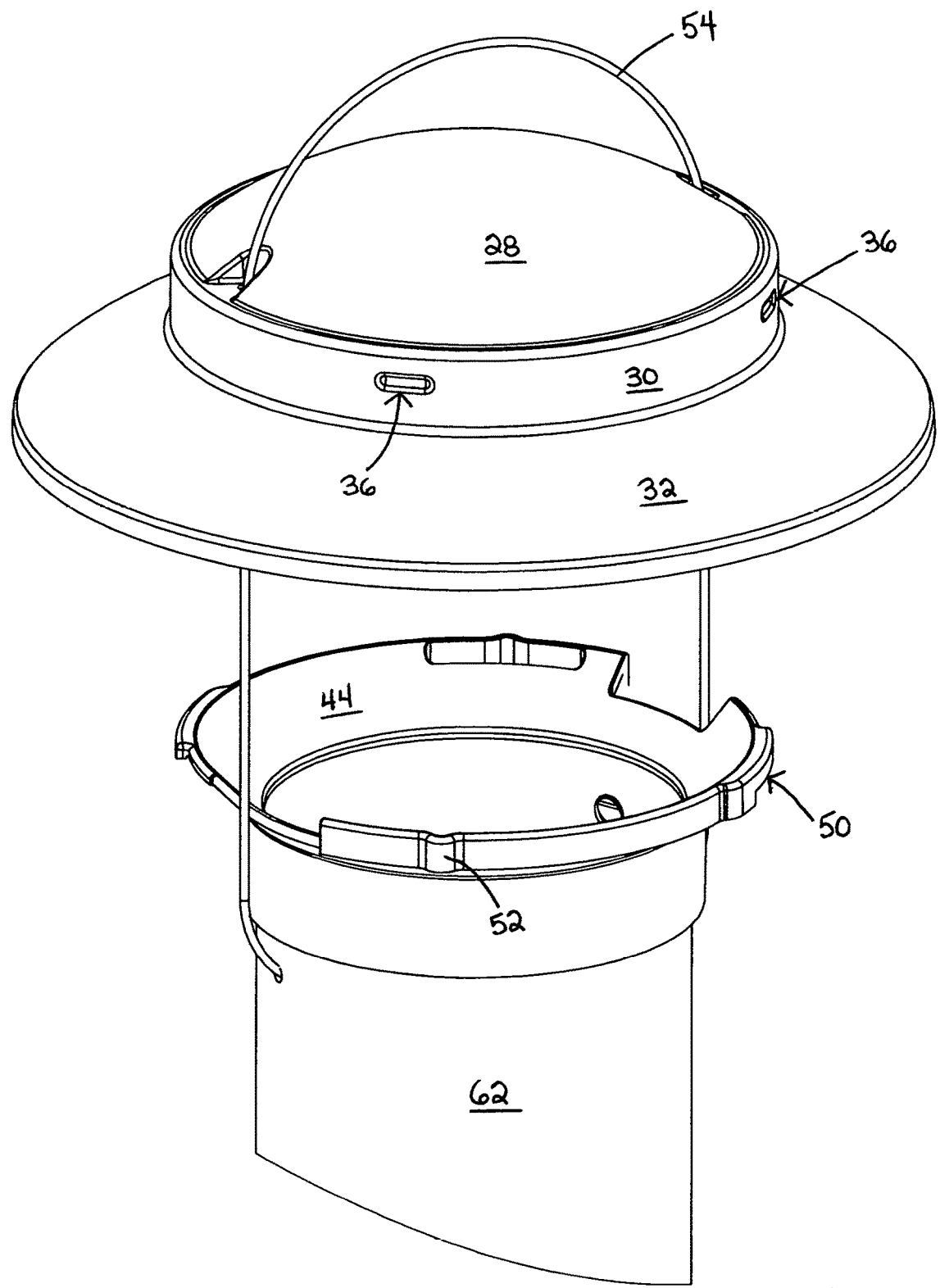
FIG. 14 is an expanded view of the upper portion of the bird feeder of FIG. 12 when the cover is in a raised position.
Figure 15:
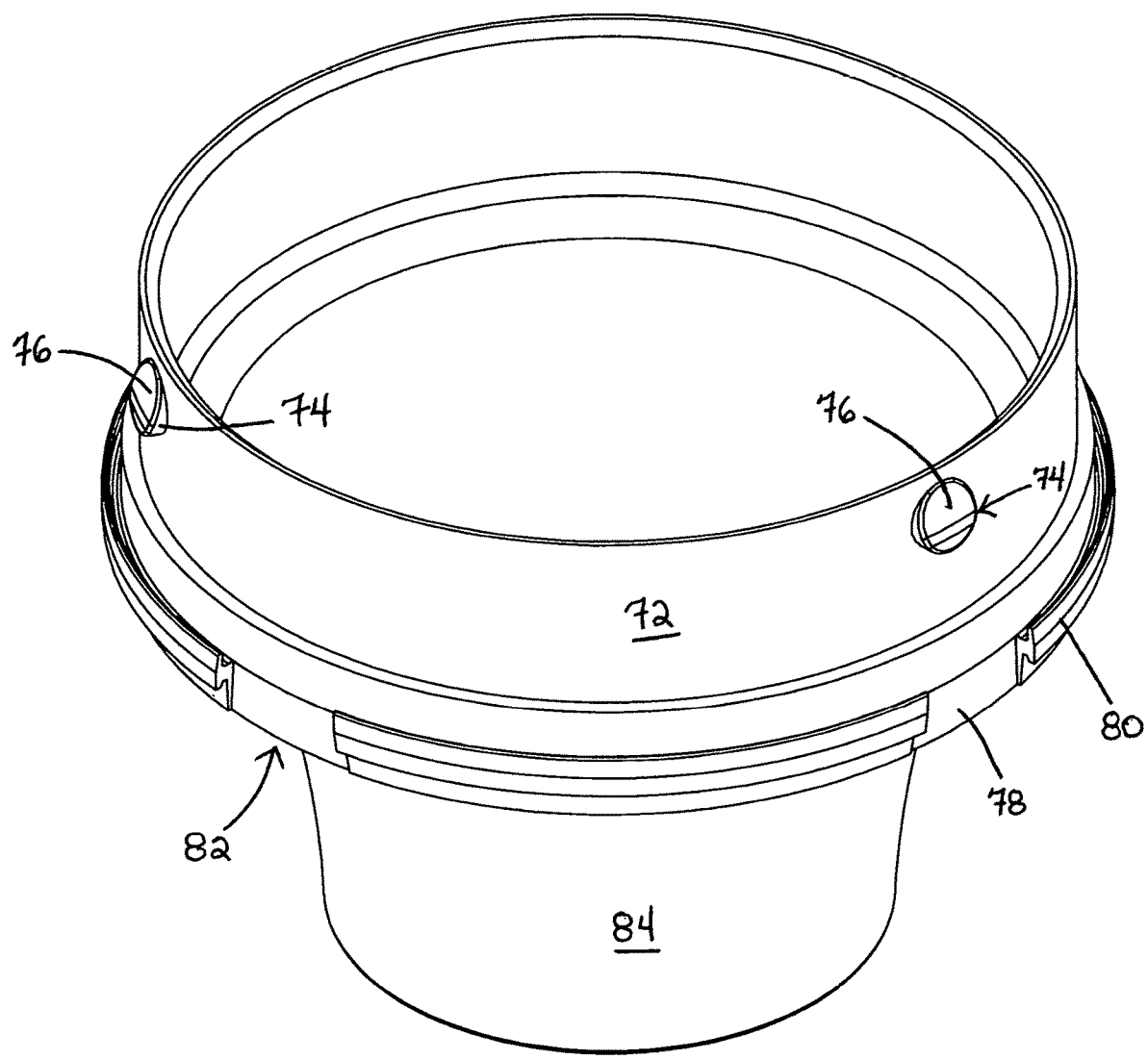
FIG. 15 is a perspective view of the funnel member of the bird feeder.
Figure 16:
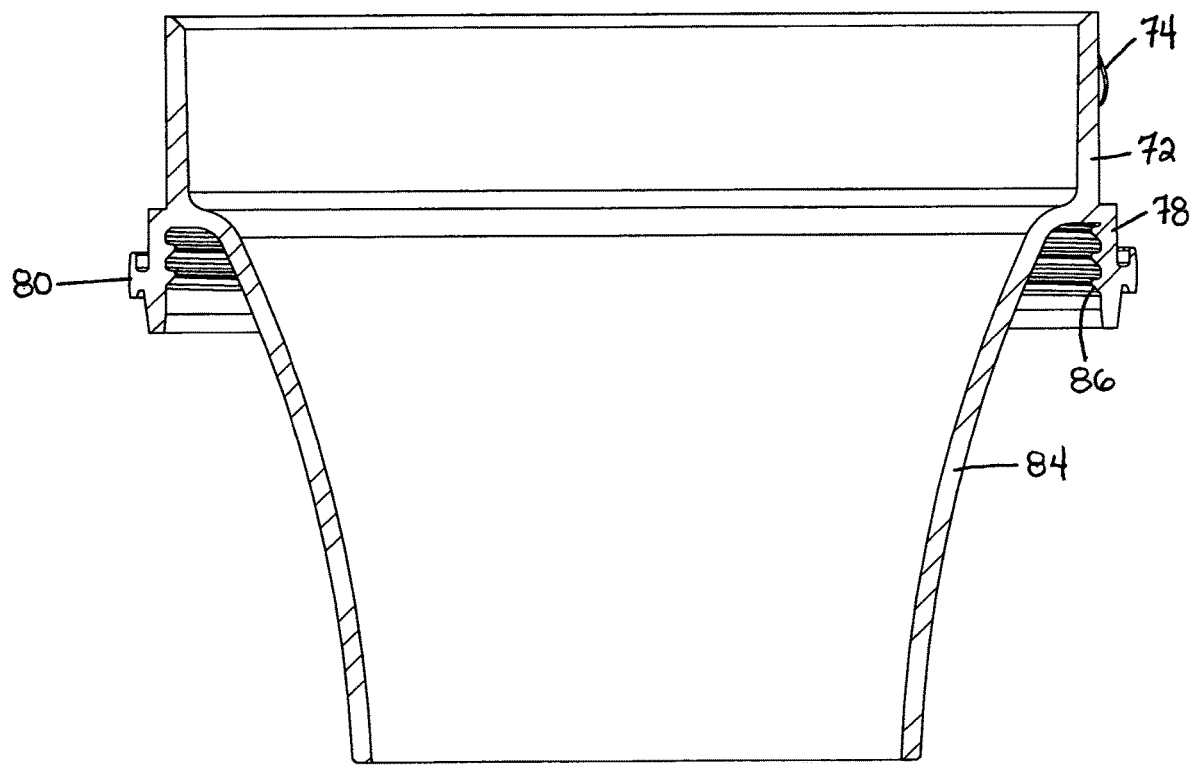
FIG. 16 is a cross-sectional view thereof.
Figure 17:
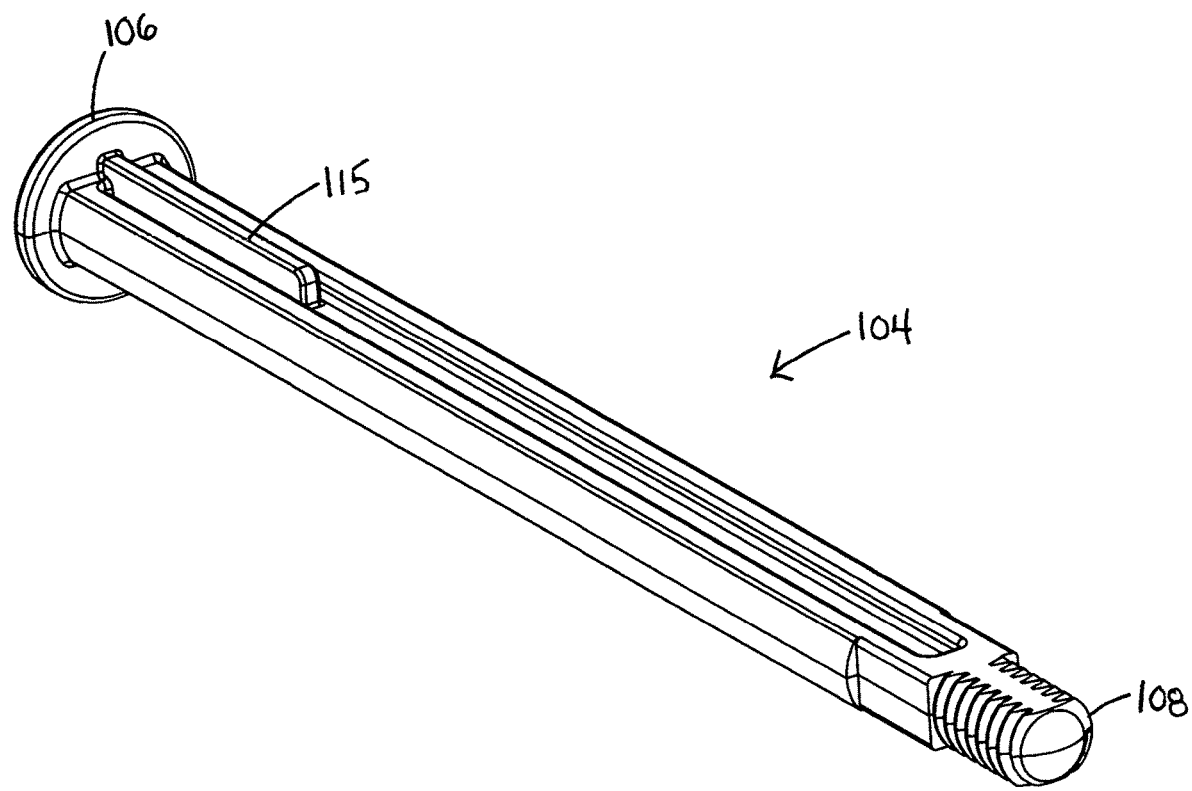
FIG. 17 is a perspective view of an interior post for biasing a spring.
Figure 18:
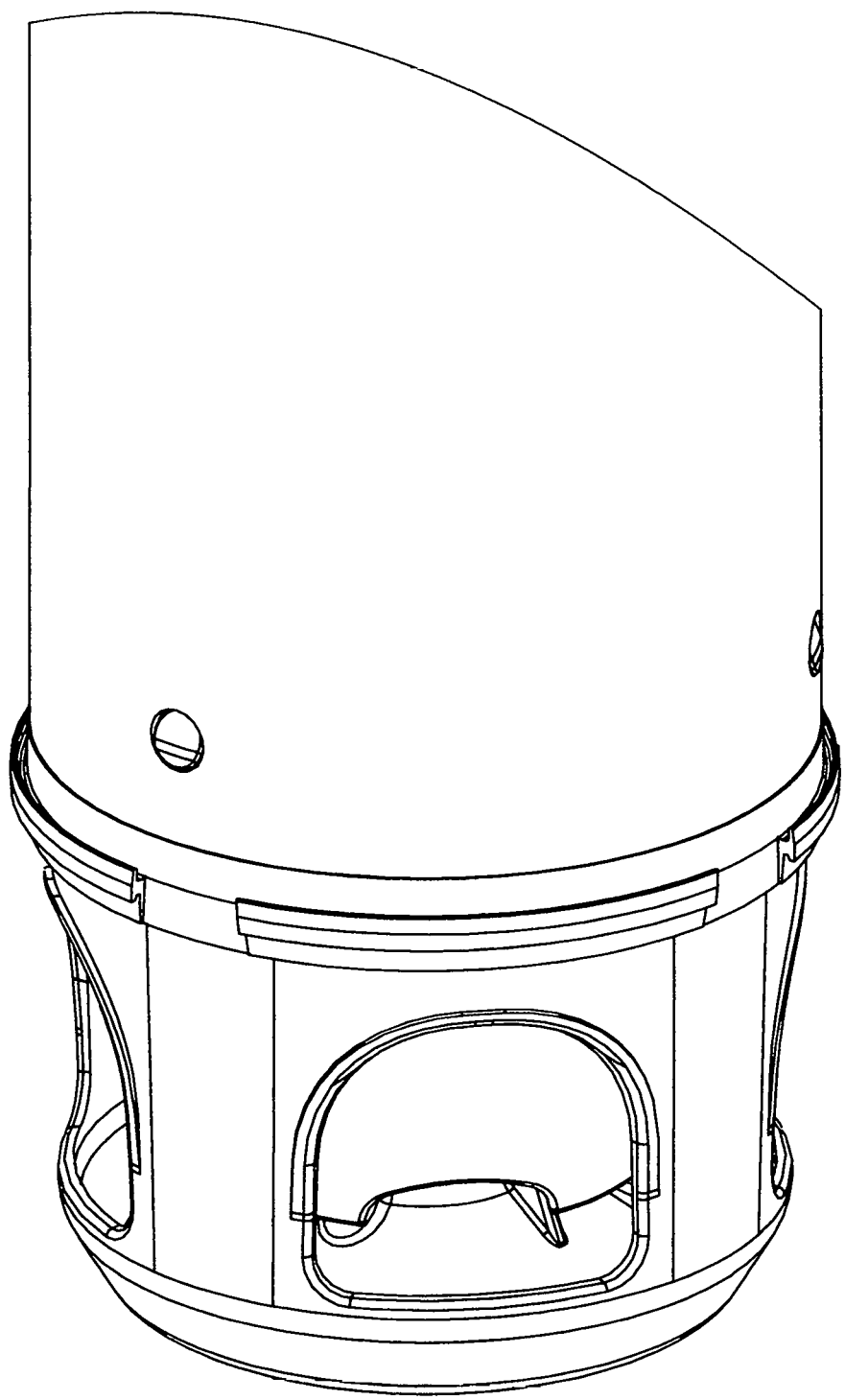
FIG. 18 is a perspective view of the lower portion of the seed tube and funnel member.
Figure 19:
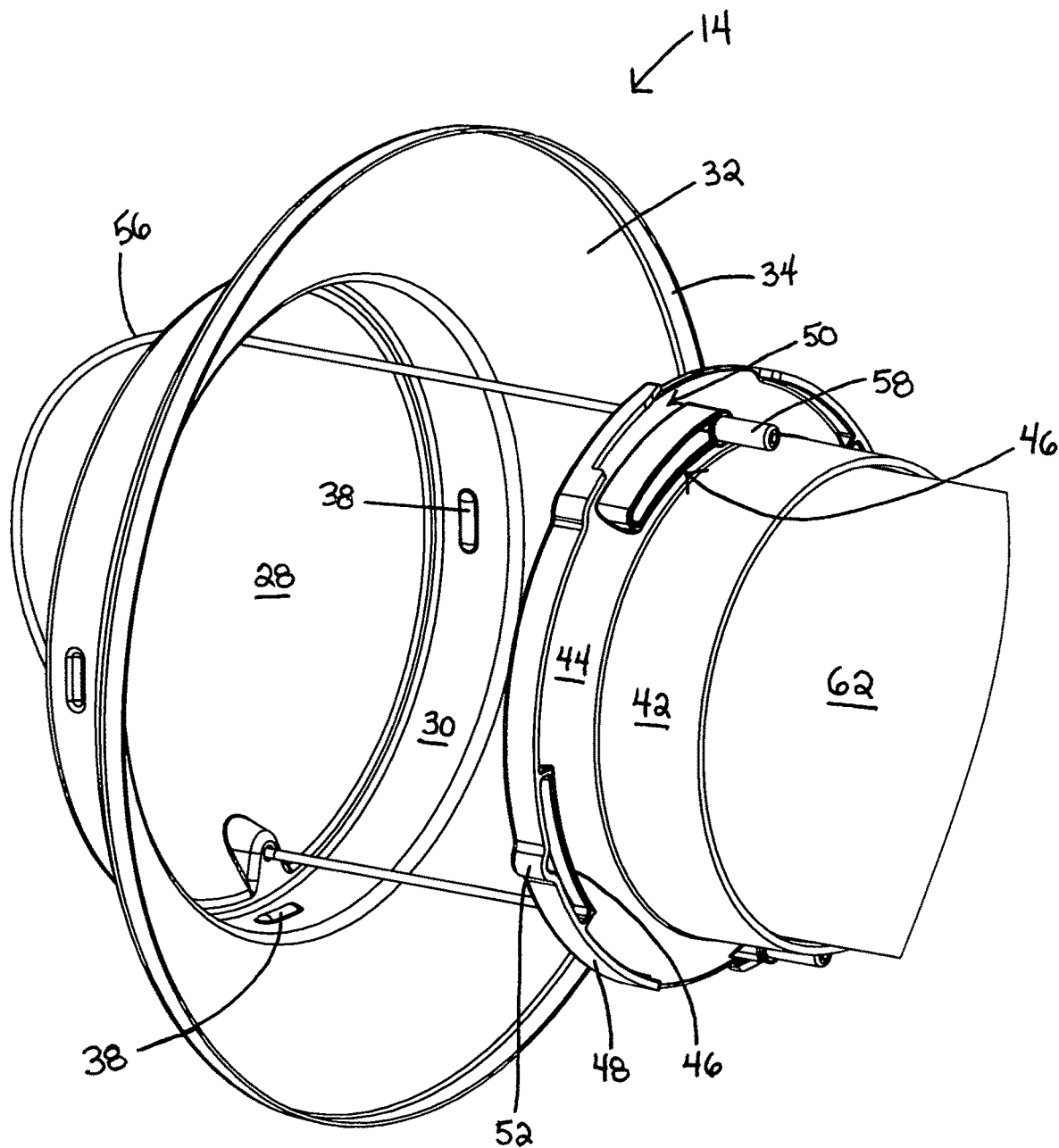
FIG. 19 is a perspective view of the cover and upper portion of the seed tube when the cover is in a raised position.
Figure 20:
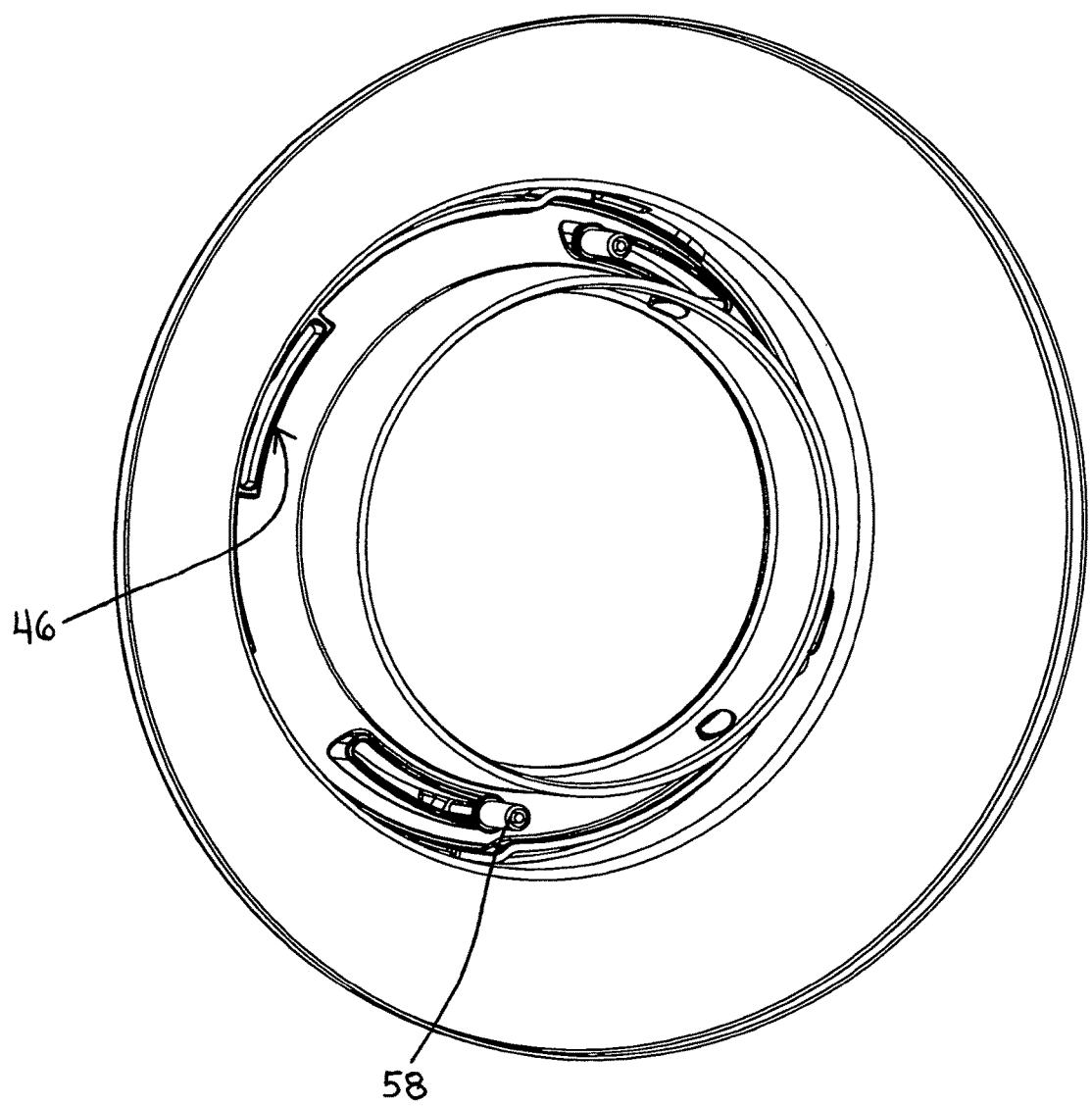
FIG. 20 is a perspective view illustrating the upper portion of the seed tube and the hanger.
Figure 21:
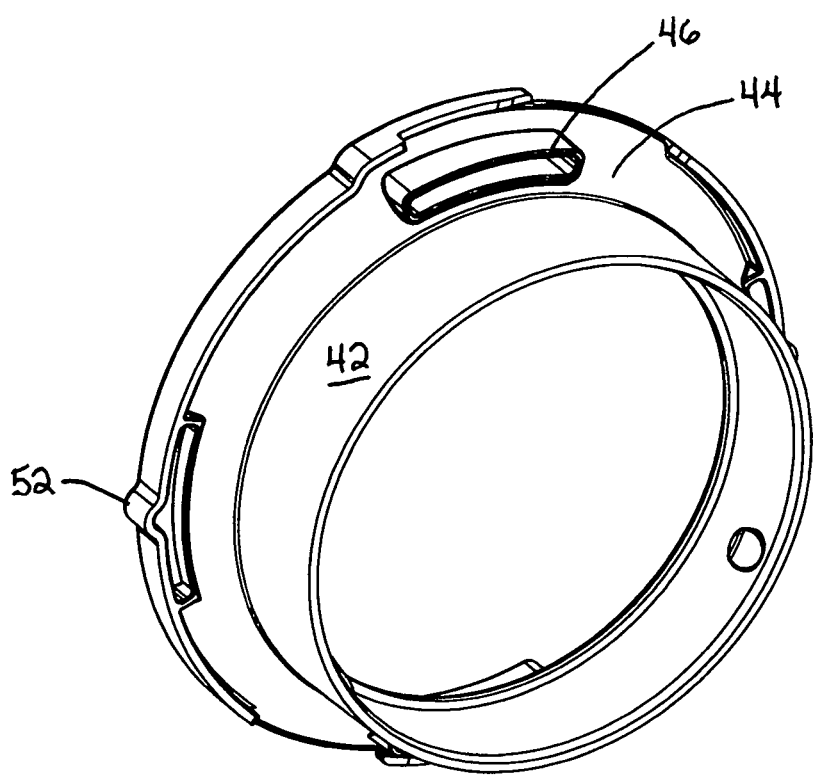
FIG. 21 is a perspective view of the bottom ring.

Referring to the drawings in greater detail and by reference characters thereto, there is illustrated a bird feeder which is generally designated by reference numeral 10.

Bird feeder 10 includes a bail generally designated by reference numeral 12, a cover generally designated by reference numeral 14, a seed tube generally designated by reference numeral 16, a top ring to fit on top of seed tube 16 and which top ring is generally designated by reference numeral 18, a seed tube base member generally designated by reference numeral 20, a shroud generally designated by reference numeral 22, and a seed funnel generally designated by reference numeral 24.

In greater detail, cover 14 has a top wall 28 which has a dome configuration. Extending outwardly from top wall 28 is a substantially vertical side wall 30. Extending contiguously with a lower end of side wall 30 is an outwardly flared wall 32. A dip edge 34 is located at the outermost extremity of outwardly flared wall 32.

For reasons which will become apparent hereinbelow, top wall 28 is provided with a pair of recesses 36 located diametrically opposite each other. On the inner surface of side wall 30 are a plurality of protrusions 38.

Seed tube 16 has a cylindrical side wall 62. While side wall 62 is shown as being in the shape of a cylinder, other configurations could be utilized. Cylindrical side wall 62 has an upper end generally designated by reference numeral 64 and a lower end generally designated by reference numeral 66. A plurality of apertures 68 are provided in both upper end 64 and lower end 66 for reasons which will become apparent hereinbelow.

A top ring 18 is mounted on upper end 64 of seed tube base member 20. Top ring 18 includes a cylindrical side wall 42 which, in the illustrated embodiment, overlies the outer surface of upper end 64 of seed tube 16. However, it will be understood that cylindrical side wall 42 may also fit interiorly of upper end 64 of cylindrical side wall 62. In the illustrated embodiment, cylindrical side wall 42 is provided with protrusions which fit within apertures 68. The arrangement may be similar to that described in U.S. patent application Ser. No. 13/998,641 wherein such a method of attachment is shown utilizing protrusions having a tapered side wall.

Extending contiguously with an upper end of cylindrical side wall 42 is a diagonally extending upper wall 44. Diagonally extending upper wall 44 may act as a funnel to permit the pouring of seeds into seed tube 16 when cover 14 is disengaged with top ring 18.

Diagonally extending upper wall 44 terminates in top side wall 48. Top side wall 48 is provided with a pair of recesses 50 formed therein. Furthermore, a pair of protrusions 52 are formed diametrically opposed to each other.

Formed on the upper end of diagonally extending upper wall 44 are a pair of slots 46 for reasons which will be discussed hereinbelow.

Bail 12, in the illustrated embodiment, consists of a flexible wire 54 having ends 56. Wire 54 is threaded through apertures 36 with each end 56 terminating in the retaining member 58. Retaining member 58 may be comprised of a metallic slug pressed into place while an alternative arrangement could consist of a knot in the ends of wire 54. It suffices to say that any device which permits wire 54 to be retained in place may be utilized. It is to be noted that wire 54 extends through apertures 36 in cover 14 and then through slots 46 in top ring 18. The length of the slots permits wire 54 to remain in place during rotation of cover 14 with respect to top ring 18.

Cover 14 is designed to be retained by locking with top ring 18. Thus, protrusions 38 are designed to engage within recesses 50 and a rotation of the cover will permit protrusions 38 to engage in a locking position on top ring 18. A pair of protrusions engage with recesses 50 while another pair will engage with protrusions 52.

Seed funnel member 24 has an upper cylindrical side wall 72 with protrusions 74 on an inside surface thereof. Protrusions 74 have a sloped outer wall 76 in the manner described in U.S. patent application Ser. No. 13/998,641. Seed funnel 24 also has a middle side wall 78 situated below upper side wall 72. Middle side wall 78 extends further outwardly in upper side wall 72. It will be noted that the portion designated by reference numeral 80 extends outwardly while there are provided gaps 82 between protrusions 80. At its lower end, seed funnel 24 is provided with a frustoconically shaped wall 84. A plurality of screw threads 86 are provided internally of middle side wall 78.

Bird feeder 10 also includes a seed tube base member 20 which will now be referred to. Seed tube base member 20 has a side wall 90 which has feed openings 92 located therein. At the upper end of side wall 90, there are provided screw threads 94 designed to mate with screw threads 86 on seed funnel 24. Internally of seed tube base member 20 is a bottom sloping wall 100 which has drainage apertures 102 located at the bottom end thereof. Internally of seed tube base member 20 there is provided an outer cylindrical housing 96 into which is mounted an inner post 104.

Inner post 104 includes a top wall 106 and a screw-threaded lower end 108. Screwthreaded lower end 108 is designed to receive a cap 110 which is also screwthreaded.

A base member 112 fits interiorly of outer housing 96 and has an interiorly extending upper wall 114. Interiorly of outer housing 96 is a spring 116 which is biased against upwardly extending portion 114 and top wall 106. Depending on the length, inner post 104 may have a rib 115 against which spring 116 may be biased.

Shroud 22 has an upper cylindrical wall 120 to which is secured a baffle 122. Thus, baffle 122 is an intrical part of the shroud. Shroud 22 also has a lower wall section in which there are provided feed access openings 126 which are normally aligned with openings 68 in seed tube 16. However, if a weight is placed on shroud 22, it will move downwardly such that feed access openings 126 and apertures 68 are no longer aligned and access to the feed is blocked. At its lower end, shroud 22 is provided with a perch structure 128 while it has a bottom wall 130 with drainage openings 132 formed therein.

It will be understood that the above described embodiment is for purposes of illustration only and that changes and modifications may be made thereto without departing from the spirit and scope of the invention.

I claim:

1. A bird feeder comprising:
   a seed tube having an upper end and a lower end, said lower end having feed openings therein;
   a top ring sitting on said upper end, said top ring having:
      a top ring upper portion comprising first and second slots formed therein;
      a top ring side wall extending downwardly from said top ring upper portion, the top ring side wall comprising at least one recess formed therein; and,
      a top ring lower portion, said top ring lower portion extending downwardly to engage with said upper end of said seed tube;
   a cover removably secured to said top ring, said cover having:
      first and second apertures formed in the cover; and,
      a cover side wall having a plurality of protrusions formed on an inner surface thereof; and,
   a hanger having first and second end sections, each of said first and second end sections having an enlarged arrangement located thereat, each of said first and second end sections passing through a respective one of said first and second slots;
   wherein the at least one recess of the top ring side wall is arranged to receive one of said plurality of protrusions to lock said cover with said top ring.

2. The bird feeder of claim 1 wherein said hanger is formed of a flexible material.

3. The bird feeder of claim 2 wherein said flexible material is a metallic wire.

4. The bird feeder of claim 3 wherein said hanger passes through an aperture formed in said upper end of said seed tube, said enlarged arrangement at each of said first and second end sections being located inwardly of said seed tube.

5. The bird feeder of claim 1 wherein said hanger is formed of a rigid material.

6. The bird feeder of claim 1 wherein said enlarged arrangements located at the first and second end sections of said hanger comprise a slug affixed to each of said end sections, said slug being sized larger than any one of said first and second slots.

7. The bird feeder of claim 1 wherein said cover has:
   a domed top wall, the cover side wall contiguous with an outer edge of said domed top wall;
   an outwardly and downwardly sloping wall; and,
   a drip edge being located at the outer extremity of said outwardly and downwardly sloping wall.

8. The bird feeder of claim 1 wherein said top ring side wall has at least one outwardly extending protrusion formed thereon.

9. The bird feeder of claim 8 wherein said plurality of protrusions on said cover side wall are arranged such that at least one of said protrusions engages with one of said outwardly extending protrusions on said top ring side wall to lock said cover in place.

10. The bird feeder of claim 1 wherein said top ring lower portion engages with an outer surface of said seed tube.

* * * * *